Jan. 27, 1970   H. F. G. UELTZ   3,491,492
METHOD OF MAKING ALUMINA ABRASIVE GRAINS
Filed Jan. 15, 1968
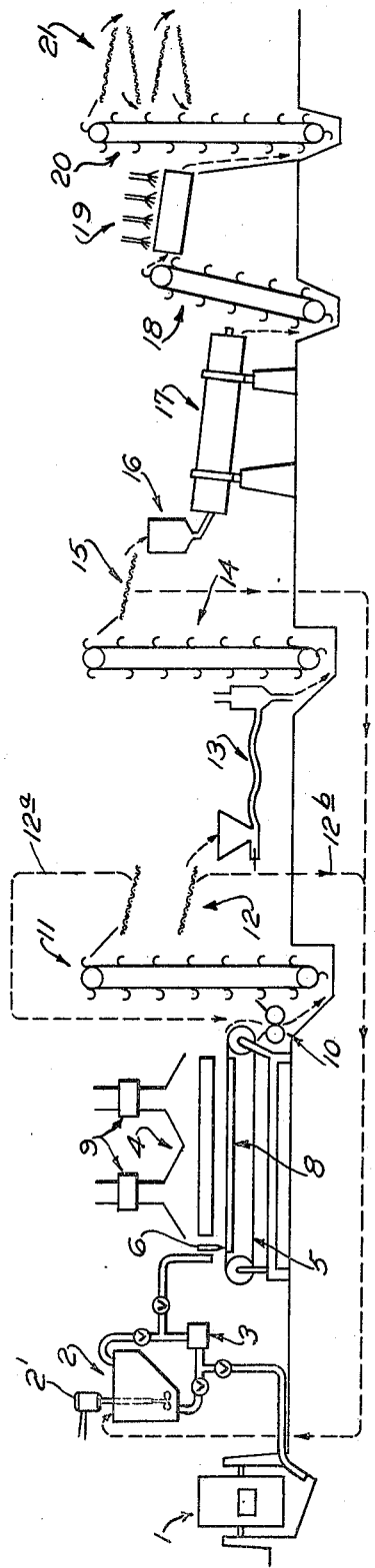
INVENTOR.
HERBERT F. G. UELTZ
BY
Barlow+Barlow
ATTORNEYS United States Patent Office 3,491,492
Patented Jan. 27, 1970

3,491,492
METHOD OF MAKING ALUMINA ABRASIVE GRAINS
Herbert F. G. Ueltz, Youngstown, N.Y., assignor, by mesne assignments, to U.S. Industries, Inc., New York, N.Y., a corporation of Delaware
Filed Jan. 15, 1968, Ser. No. 697,905
Int. Cl. B24d 3/00; C04b 31/00; C09c 1/68
U.S. Cl. 51—309                11 Claims

ABSTRACT OF THE DISCLOSURE

Process for making an aluminous abrasive grain formed from bauxite, or mixtures of bauxite and Bayer process alumina wherein the comminuted aluminous material is mixed with water and ferric ammonium citrate, or with ferric ammonium citrate and citric acid and reduced to a state of fine subdivision by milling to give a fluid slurry of high solid content, drying said slurry to coherent cakes having a thickness equal to one dimension of the final grain before sintering, breaking said cakes to grains, screening, optionally rounding said grains by air mulling, screening, sintering, cooling, and screening to yield the final product.

CROSS REFERENCES TO RELATED APPLICATIONS

One of the steps in the process of this application is set forth in greater detail in applicant's co-pending application entitled "Aluminous Slurries," Ser. No. 697,599 filed Jan. 15, 1968 and also to his related application concerning the breaking of a solid intermediate product entitled "Abrasive Breaking Device and Method," Ser. No. 697,904 filed Jan. 15, 1968.

BACKGROUND OF THE INVENTION

Sintered abrasives, made by sintering milled bauxite agglomerates have been known for some time and have proved of particular effectiveness in high pressure snagging of stainless steel billets. One example of such a sintered abrasive is given in U.S. Patent 3,079,243. In order to achieve a high density in the unsintered grain, said patent specifies and claims that milled bauxite is compacted under affirmative pressure of the order of five tons per square inch, followed by formation of grain size agglomerates which are sintered. The use of affirmative pressures requires the purchase and maintenance of presses or machinery which will exert said affirmative pressure to cause agglomeration and compaction.

Elimination of the step of affirmative pressure as in U.S. Patent 2,347,685 yields products of inferior density, and affords little or no control of the grain shape.

SUMMARY OF THE INVENTION

This invention describes a process for making sintered abrasive grains of high density and generally cubical shape in which no affirmative pressure is used. Calcined bauxite, or bauxite and Bayer process alumina mixtures are provided in a milled aqueous slurry having a high concentration of the solid by weight by virtue of the presence of ferric ammonium citrate, or ferric ammonium citrate and citric acid, thereafter drying this slurry to a coherent plate of controlled thickness, breaking this plate to yield cuboidal grains, screening the grains to obtain the sizes wanted, optionally rounding the edges and corners of the grains by air mulling, screening the grains, for size, sintering, cooling, and finally screening for size.

BRIEF DESCRIPTION OF THE DRAWING

The figure is a schematic view showing the various steps in the process.

DESCRIPTION OF THE PREFERRED EMBODIMENTS

As principal raw material I use calcined bauxite, or a mixture of calcined bauxite and Bayer process alumina in which the Bayer process alumina may be up to 60 percent by weight of the mixture. By the term bauxite as hereinafter used, I include mixtures of bauxite and Bayer process alumina as stated above.

I prefer to use calcined bauxite from Surinam but calcined bauxite from other areas will be suitable. The chemical composition of calcined Surinam bauxite will vary somewhat but a representative analysis will be:

|  | Percent by wt. |
| --- | --- |
| $Al_2O_3$ | 86.72 |
| $SiO_2$ | 3.30 |
| $Fe_2O_3$ | 5.28 |
| $TiO_2$ | 3.73 |
| Loss on ignition | 0.97 |
|  | 100.00 |

Bayer process alumina is a white purified form of aluminum oxide, provided typically in a fine granulated state. A representative chemical analysis is:

|  | Percent by wt. |
| --- | --- |
| $Al_2O_3$ | 99.2 |
| $SiO_2$ | 0.02 |
| $Fe_2O_3$ | 0.03 |
| $Na_2O$ | 0.45 |
| Loss on ignition | 0.2 |

The calcined bauxite is comminuted to approximately 30 mesh size and finer or until it is of a satisfactory size for use as ball mill feed. A roll crusher is suited to this purpose. Alternately, dust and fines screened out of calcined bauxite as it is received are satisfactory and the removal of this dust and fines upgrades the remainder of the calcined bauxite for other purposes such as for furnace feed in the manufacture of fused abrasives.

The fine calcined bauxite is put in a rotating or vibrating ball mill of conventional design designated 1 in the drawing. Water and ferric ammonium citrate are also put in the mill. Citric acid may also be added. I prefer to use a mixture which will give the highest possible content of bauxite in the mill slurry and still retain sufficient fluidity to permit the slurry to be poured and pumped. One formulation I have found satisfactory is:

|  | Percent by wt. |
| --- | --- |
| Calcined bauxite | 78.0 |
| Water | 20.8 |
| Ferric ammonium citrate | 1.2 |
|  | 100.0 |

Another preferred formulation is:

|  | Percent by wt. |
| --- | --- |
| Calcined bauxite | 77.9 |
| Water | 20.8 |
| Ferric ammonium citrate | 1.2 |
| Citric acid | 0.1 |

In practice, the ranges of the various ingredients of the slurry are:

|  | Percent by wt. |
| --- | --- |
| Calcined bauxite | 45 to 80 |
| Water | 55 to 20 |
| Ferric ammonium citrate | 0.2 to 4.0 |
| Citric acid | 0 to 0.5 |

The mixture is milled until the average particle size of the bauxite has been reduced to about seven microns or below, and I prefer to mill until an average particle size of about two or three microns has been attained. Conditions of milling such as size and amount of media, amount of charge and speed of rotation are those in accordance with good milling practice which are well known. As an example, I have found that the following conditions will produce a good slurry:

Type of mill—rotating, horizontal, cylindrical, unlined
Size of mill—48" long by 54" diameter inside
Speed of rotation—26 r.p.m.
Type of media—alumina ceramic rods
Size of media—13/16" in length and diameter
Weight of media—3,000 pounds
Weight of calcined bauxite—750 pounds
Weight of water—200 pounds
Weight of ferric ammonium citrate—11.5 pounds
Weight of citric acid—1.0 pound
Time of milling—20 to 24 hours approximately.

The action of ferric ammonium citrate has been found to be adversely affected by excessive heat which may be generated during prolonged milling. Therefore, I prefer to have cold water running over the outside shell of the mill during operation to keep the contents of the mill relatively cool.

The slurry resulting from the foregoing procedure contains 78 percent solid material in suspension and only 20.8 percent water, yet it is very fluid and is easily pumped or poured as a consequence of the presence of ferric ammonium citrate and citric acid. If a slurry were made from calcined bauxite and water alone, only about 45 percent solid material could be incorporated in the milled slurry. Higher concentrations of bauxite would yield non-pourable pastes and semi-solid masses.

The high concentration slurries resulting from the foregoing procedures offer many advantages. The productive capacity of the ball mill is greatly increased over ordinary slurry milling since a major proportion of the mill charge is valuable aluminous material, and a minor proportion is water which is later driven off and represents no value in the final product. Since there is only a small water content, there is much less water to be driven off in the subsequent drying step. This increases the capacity of the drying equipment and conserves fuel or power which would be needed to dry slurries of lower concentration. Further, and of great importance, is the character of the solid material obtained by drying the slurry. The high concentration slurry of this invention, when dried by evaporation, produces a coherent and mechanically strong cake which may be broken cleanly into grains having sufficient durability to pass through subsequent process steps with negligible attrition. Low concentration slurries as with bauxite and water alone, produce softer cakes which may be crumbly and which may partly disintegrate when subjected to further handling.

The density of the slurry resulting from the example given is remarkably high, usually ranging between 2.20 and 2.40 gm./cc. When dried, such a slurry gives a high density cake, so that it is unnecessary to provide affirmative pressure to compact the solid material to cause agglomeration. The unsintered density of the concentrated slurry of the example will ordinarily be greater that that achieved by mechanically compressing milled dry bauxite powder at five tons per square inch. The use of the concentrated slurry of this invention thus is more advantageous than prior art in both economy of process and quality of product.

After milling, the slurry is removed from the mill and transferred to holding tank 2 with an agitator 2' by means of pump 3. By appropriate adjustment of the associated valves, the same pump transfers the slurry to the drying machine 4 in a controlled stream. The slurry is deposited on the endless belt 5 of the machine. This belt is made of heat resisting material such as fiber glass cloth impregnated with fluorocarbon resin to make it impervious and non-sticking. The belt moves so as to carry the deposited slurry under leveling blade 6, disposed essentially transverse to the belt. This blade may be set at any distance above the belt so as to level and distribute the slurry passing under it to produce a ribbon of slurry on the belt of uniform and pre-determined thickness, and of width substantially equal to that of the belt. The thickness of the ribbon of slurry is equal to one dimension of the finished grain adjusted to compensate for shrinkage in subsequent drying and sintering. Thus, the yield of grain of the desired size is maximized and grains of undesired sizes are not generated. This is an important feature of this process, leading to a very high yield in grains of useful size. By appropriate adjustment of the blade height, other sized grains may be produced at will.

The levelled ribbon of slurry is then carried through the drying machine 4. The fluid slurry upon drying is first transformed to a stiff paste, then to a solid plate-like cake, and finally completely dried at which time it emerges from the drying machine in the form of coherent reticulated plates of controlled thickness which are quite strong and will withstand mechanical handling.

The drying machine is essentially a box through which the endless belt passes. The belt may be heated by radiant and/or convective heaters 7 disposed above the top of the belt and also may be heated conductively by heaters 8 disposed under that portion of the belt which carries the slurry. Water vapor from the drying slurry are evacuated by suitable hoods and exhaust blowers 9. The dryer temperature is controllable and is normally slightly below the boiling point of water. If the temperature is too high, it will result in undesirable porosity in the dried plates.

The dry plates emerge from the discharge end of the dyer and fall into the breaking device 10. This device consists of two metallic rollers, one of them faced with a resilient layer or jacket of rubber or the like. It has been found that a metal roller operating against a resilient roller will break the plates into generally cubical or cuboidal grains as described in application Ser. No. 697,-904. A plate falling between such rollers is subject to a cross-breaking stress by virtue of contact with the surface of the metal roller which forces the plate into the resilient surface. At the same time, the resilient surface is compressed radially thereby and expands tangentially exerting a tensile stress on the plate. The combination of cross-breaking and tensile stresses cause the plate to break into generally cubical or cuboidal grains which is a favorable shape for abrasive grains used in heavy grinding. The presure between the rollers may be adjusted to cause the plates to break to the desired length and width. If the rollers are too tight, the grains will be crushed, and if too loose, the width and length of the grains will be too great. Thus three dimensional control of the size of the grains is provided by this process; one dimension thereof being determined by the thickness of the slurry ribbon on the belt, and the other two dimensions by the pressure adjustment on the breaking device.

Although the grains so produced are largely of the size desired, a few of the grains will be slightly larger, and a certain amount of fine particles will be produced in the breaking operation. For this reason, the grains are next screened for size. The grains are elevated by elevator 11 of conventional design, and discharged on top of multi-deck screen 12 also of conventional design. The screems are selected so that grains in the desired size range fall through the top screen but are retained by the second screen. Grains retained on the top screen are re-cycled to the breaking device, as indicated by dotted line 12a while grains passing through the second screen are re-cycled to the holding tank 2 as indicated by dotted line 12b or to a separate re-mixing tank, no shown, where they will be mixed with water, and the resulting regenerated slurry again fed to the drying machine. Thus substantially all the bauxite put into the process will be converted to useful abrasive grains of the desired sizes, and substantially none of the bauxite will be wasted in by-products and unwanted sized grains.

For some grinding applications, grains having sharp edges and corners are preferred, and for other applications the edges and corners should be rounded. If the latter is the case, an optional step may be inserted at this point.

The grains, sized as above, are fed into air-mulling device 13. The grains are aspirated by a stream of air, and the air-entrained grains are carried by the air stream through a slightly bent or curved pipe. The scuffing action of the grains impinging obliquely on the interior surface of the pipe causes the edges and corners to be rounded, and control of the degree of rounding may be exercised by altering the velocity of the air stream. The rounded grains collect in a tank on the air-mulling device, and the effluent dust is collected and returned to the holding tank for regeneration as slurry. The grains fall from the tank and are elevated by elevator 14 and re-screened in screen 15 to remove any grains which have been rendered under-sized in the air-mulling step. These grains, which normally constitute a very small portion of the amount introduced in the air-mulling device are collected for eventual regeneration of the slurry as before as indicated by dotted line 15a.

The grains now pass to kiln holding tank 16 and from there to the kiln 17 for sintering.

Sintering is a step of heating wherein the individual particles comprising each grain re-crystallize to give a structure of interlocking crystals which imparts substantial hardness and mechanical strength to the body. The grains above may be sintered in conventional ceramic kilns of the periodic type wherein the grains are normally put in saggers or refractory containers and heated and cooled in a static bed. However, I prefer to conduct the sintering in a rotary kiln where the grains are introduced at the upper end and proceed downward through the hot zone and finally to the discharge, impelled by the rolling action of the sloped cylindrical kiln. Thereafter, the hot grains are elevated in elevator 18 and cooled in cooler 19. Finally they are again elevated in elevator 20 and screened to find sizes in multi-deck screen 21. Sintering depends upon several factors including kiln atmosphere, temperature, and time, and these are varied to obtain the degree of sintering desired. I prefer to use an oxidizing atmosphere. The temperature of sintering for grains made from the slurries herein before described will normally be between 1300° C. and 1600° C. and more usually between 1400° C. and 1500° C. depending on the composition of the aluminous material and other variables. The retention time may vary from about ten minutes to several hours, and this cannot be specified exactly but may be about 45 minutes.

In the sintering step, the density of the grains increases due to consolidation which accompanies recrystallization. Density and final crystal size are therefore the important quantities by which to judge the degree of sintering. The sintered grain density measured on the final grains will generally be in the range 3.50 gm./cc. to 3.85 gm./cc., but usually about 3.65 gm./cc. to 3.72 gms./cc. The ultimate crystal size will generally average in the range four to fifteen microns but typically about six to ten microns.

I claim:

1. Process for making abrasive grain formed from calcined bauxite wherein the comminuted calcinced bauxite is prepared in the form of an aqueous slurry containing ferric ammonium citrate, said slurry being at least 45 percent by weight and not more than 80 percent by weight of calcined bauxite, at least 20 percent by weight and not more than 55 percent by weight of water, at least 0.2 percent by weight and not more than 4.0 percent by weight of ferric ammonium citrate, milling said slurry until the average particle size of the calcined bauxite particles is seven microns or smaller in size, drying said milled slurry in the form of a layer of plate-like cakes having a thickness substantially equal to one dimension of the final grains corrected for subsequent shrinkage in processing, breaking the dry plate-like cakes resulting therefrom into generally cubical or cuboidal grains of the desired size corrected for shrinkage in subsequent processing, screening for size, sintering in the temperature range 1300° C. to 1600° C and screening to size.

2. Process according to claim 1 in which the step of mulling to round the edges of the grains is interposed before the sintering step.

3. Process according to claim 1 in which Bayer process alumina is substituted for calcined bauxite in amounts up to 60 percent by weight of the mixture.

4. Process according to claim 2 in which Bayer process alumina is substituted for calcined bauxite in amounts up to 60 percent by weight of the mixture.

5. Process according to claim 1 where the slurry contains from 0 to 0.5 percent by weight of citric acid.

6. Process according to claim 2 where the slurry may contain from 0 to 0.5 percent by weight of citric acid.

7. Process for making abrasive grain from aluminous material comprised of a mixture of calcined bauxite and Bayer process alumina in which the calcined bauxite is at least 40 percent by weight and up to 100 percent by weight of said mixture, preparing said aluminous material in the form of an aqueous slurry containing at least 45 percent by weight and not more than 80 percent by weight of aluminous material, at least 20 percent by weight and not more than 55 percent by weight of water, at least 0.2 percent by weight and not more than 4.0 percent by weight of ferric ammonium citrate, and up to 0.5 percent by weight of citric acid, milling said slurry until the average particle size of the aluminous material is seven microns or smaller in size, drying said milled slurry in the form of a layer of plate-like cakes having a thickness substantially equal to one dimension of the final grains corrected for subsequent shrinkage in processing, breaking the dry plate-like cakes resulting therefrom into generally cubical or cuboidal grains of the desired size corrected for shrinkage in subsequent processing, screening for size, sintering in the temperature range 1300° C. to 1600° C., and screening to size.

8. Process according to claim 7, in which the unsintered grains have been partially rounded by air mulling.

9. Process for making abrasive grain formed from calcined bauxite wherein the calcined bauxite is comminuted to about 30 mesh size and finer, and ball milled with water and ferric ammonium citrate substantially in the proportion:

| | Percent by wt. |
|---|---|
| Calcined bauxite | 78.0 |
| Water | 20.8 |
| Ferric ammonium citrate | 1.2 | until the calcined bauxite particles average about 2–3 microns in size, drying the resultant fluid slurry on a belt dryer in a plate-like layer having a thickness substantially equal to one dimension of the final grains corrected for subsequent shrinkage in processing, breaking the dried plates resulting therefrom into generally cubical or cuboidal grains of the desired size corrected for shrinkage in subsequent processing, optionally air mulling to round the grains, screening for size, sintering in a rotary kiln in the temperature range 1350° C. to 1500° C., and screening to size.

10. Process according to claim 9 wherein the slurry may contain from 0 to 0.5 percent by weight of citric acid.

11. Process according to claim 9 wherein the calcined bauxite may be replaced with Bayer process alumina so that there are equal weights of calcined bauxite and Bayer process alumina in the slurry.

References Cited

UNITED STATES PATENTS

| | | | |
|---|---|---|---|
| 2,235,880 | 3/1941 | Hutchins | 51—308 |
| 2,369,709 | 2/1945 | Baumann et al. | 51—309.1 |
| 2,399,225 | 4/1946 | Heany | 106—65 |
| 2,725,286 | 11/1955 | Coes | 51—309 |
| 3,079,243 | 2/1963 | Ueltz | 51—307 |
| 3,183,071 | 5/1965 | Rue et al. | 51—298 |
| 3,336,108 | 8/1967 | Leatham et al. | 106—65 |
| 3,387,957 | 6/1968 | Howard | 51—308 |

DONALD J. ARNOLD, Primary Examiner

U.S. Cl. X.R.

51—293; 106—65; 264—56